United States Patent
Gulminelli (10) Patent No.: US 12,485,563 B2
(45) Date of Patent: Dec. 2, 2025

(54) CUTTING UNIT FOR THERMOPLASTIC PIPES

(71) Applicant: SICA S.P.A., Alfonsine (IT)

(72) Inventor: Marco Gulminelli, Ravenna (IT)

(73) Assignee: SICA S.P.A., Alfonsine (IT)

( * ) Notice: Subject to any disclaimer, the term of this patent is extended or adjusted under 35 U.S.C. 154(b) by 286 days.

(21) Appl. No.: 18/252,210

(22) PCT Filed: Nov. 8, 2021

(86) PCT No.: PCT/IB2021/060302
§ 371 (c)(1),
(2) Date: May 9, 2023

(87) PCT Pub. No.: WO2022/101754
PCT Pub. Date: May 19, 2022

(65) Prior Publication Data
US 2023/0405859 A1   Dec. 21, 2023

(30) Foreign Application Priority Data

Nov. 11, 2020   (IT) .......................... 102020000026960

(51) Int. Cl.
*B26D 1/16* (2006.01)
*B26D 1/18* (2006.01)
(Continued)

(52) U.S. Cl.
CPC ................ *B26D 1/16* (2013.01); *B26D 1/18* (2013.01); *B26D 3/16* (2013.01); *B26D 5/005* (2013.01)

(58) Field of Classification Search
CPC ........ B23D 21/00; B23D 21/02; B23D 21/04; B23D 45/126; B23D 45/22; B26D 3/16;
(Continued)

(56) References Cited

U.S. PATENT DOCUMENTS

| 4,084,463 A | 4/1978 | Kanbara |
| 2008/0229584 A1* | 9/2008 | Shepherd ............... B23D 21/04 30/95 |

(Continued)

FOREIGN PATENT DOCUMENTS

| CN | 106272621 A * | 1/2017 |
| DE | 102013220618 A1 | 4/2015 |

(Continued)

OTHER PUBLICATIONS

English language translation of CN-106272621-A to Kong et al. obtained from https://www.epo.org/en.*

(Continued)

*Primary Examiner* — Evan H Macfarlane
(74) *Attorney, Agent, or Firm* — SHUTTLEWORTH & INGERSOLL, PLC; Timothy J. Klima (57) ABSTRACT

A cutting unit for thermoplastic pipes includes a ring rotating about an axis and in which a pipe is progressively moved in a sliding fashion such that a longitudinal axis of the pipe coincides with the axis of rotation and a cutting arm mounted on the ring. A distance measurement sensor located on the ring is configured for acquiring, during rotation of the ring, values representing a radial distance between the measurement sensor and an outer surface of the pipe. The distance is measured on a measurement plane transversal to the axis of rotation. The cutting unit also includes a processing and control unit operatively connected to the measurement sensor and configured for receiving the values measured and for calculating, on the basis of the values, at least one parameter representing a peripheral profile of the pipe on the measurement plane.

19 Claims, 4 Drawing Sheets

(51) Int. Cl.
*B26D 3/16* (2006.01)
*B26D 5/00* (2006.01)

(58) Field of Classification Search
CPC ........ B26D 3/162; B26D 3/166; B26D 3/167;
B26D 1/16; B26D 1/18; B26D 1/58;
B26D 2007/2671; B26D 5/02; B26D
5/04; B26D 5/06; B26D 5/005
See application file for complete search history.

(56) References Cited

U.S. PATENT DOCUMENTS

2014/0116214 A1\* 5/2014 Shibayama ............ B26D 3/003
83/54
2015/0306780 A1\* 10/2015 Tabanelli ............... B23D 59/02
83/22

FOREIGN PATENT DOCUMENTS

| EP | 0826467 A1 | | 3/1998 | | |
|---|---|---|---|---|---|
| KR | 100644375 B1 | \* | 11/2006 | ............. | B23D 21/04 |
| KR | 20180005970 A | \* | 1/2018 | ............. | B23D 21/00 |
| WO | 2014097182 A2 | | 6/2014 | | |

OTHER PUBLICATIONS

English language translation of KR-20180005970-A to Kim obtained from https://www.epo.org/en.\*
English language translation of KR-100644375-B1 to Chun obtained from https://www.epo.org/en.\*
International Search Report dated Feb. 23, 2022 from counterpart PCT App No. PCT/IB2021/060302.

\* cited by examiner

CUTTING UNIT FOR THERMOPLASTIC PIPES

This application is the National Phase of International Application PCT/IB2021/060302 filed Nov. 8, 2021 which designated the U.S.

This application claims priority to Italian Patent Application No. 102020000026960 filed Nov. 11, 2020.

TECHNICAL FIELD

This invention relates to a unit for cutting pipes made of thermoplastic material.

In particular, the invention relates to a unit for cutting pipes made of thermoplastic material which may be widely used preferably in automatic cutter machines designed for cutting pipes with large diameters and/or with large thicknesses, such as, for example, pipes made of polyolefin material used for making pipes for transporting fluids even under pressure (typically water or gas) and in general for pipes designed for making supply and/or drainage pipes used, for example, in building works, sewerage networks, drinking water distribution networks.

BACKGROUND ART

In the systems for producing pipes made of thermoplastic material, the automatic cutter machines are normally positioned in line with an extrusion station which produces a continuous pipe, more specifically downstream of the latter.

The automatic cutter machines typically have a cutting unit equipped with one or more cutting tools configured for making cuts on the pipe being extruded and generating in sequence a plurality of pieces of predetermined length.

Usually, the cutting unit has a ring movable in a rotary direction about the pipe on which the cutting tools are mounted.

Usually, according to preferred embodiments, during the cutting step, the cutting unit moves synchronously with the feeding of the pipe along its longitudinal axis. In this situation, the cutting tool is fed radially until it comes into contact with the pipe to penetrate the thickness. At the same time, the mobile ring rotates about the axis of the pipe so that the cutting tool can make a complete circumferential cut in one or more successive rotations, forming in this way a piece of pipe.

Once a cut has been made, the cutting tool is moved away radially from the pipe so that there is no longer contact between the cutting tool and the profile of the pipe.

It is known that the pipe during the extrusion process, since it is not yet perfectly hardened, generally tends, due to the effect of its own weight, to deviate from the cylindrical shape set by the extruder and to preferably adopt a shape with an elliptic cross-section. Said phenomenon obviously increases with the increase in the dimensions of the pipe in terms of diameter and relative thickness. The elliptical shape adopted by the pipe by the action of gravity generally has the larger semi-axis positioned horizontally, whilst the smaller one is positioned vertically.

Typically, in the prior art cutting units during the set-up steps prior to starting the extrusion, the operator who controls the cutter machine sets the machine with reference to the nominal diameter of the pipe which must be extruded. In particular, the cutting tools are designed for cutting the reference diameter and the cutting unit is then actuated. Since the movable ring on which the cutting tools are mounted has a circular cross section whilst the pipe, as mentioned, could have a more or less elliptical cross section, during rotation of the movable ring about the pipe there is the risk that the cutting tools do not enter into correct contact with the entire profile of the pipe in the cutting section, describing said tools fundamentally circular trajectories. In fact, when the cross-section of the pipe is typically elliptical, there will be points wherein the cutting tools will risk imposing an excessive cutting action on the section of the pipe (giving rise to possible mechanical stresses on the cutting unit and on the pipe, also generating an imprecise cut), and others points wherein, on the other hand, the penetration will not correspond to what is expected and, therefore, the cut may not be completed.

There are prior art cutting units for which it is possible to define the maximum diameter and the minimum diameter of the pipe being extruded (a measurement which it is not simple to perform during the process) and therefore, in principle, obtain the hypothetical elliptic shape adopted by the pipe.

Disadvantageously, these cutting units also have drawbacks in terms of precision and versatility.

In fact, said cutting units adopt as an elliptical shape deriving from the maximum and minimum diameter inserted the one typically having the larger half-axis positioned horizontally (parallel to the ground) and the smaller half-axis positioned vertically (perpendicular to the ground).

However, if the cross-section of the pipe does not exactly have an elliptic cross-section having the larger semi-axis positioned horizontally and the smaller half-axis positioned vertically or more generally adopts a non-circular cross-section but not even perfectly elliptical in shape, for example due to the presence of a recess or a bump, the cutting tools would in any case be positioned and moved incorrectly relative to the actual section to be cut.

In fact, as already mentioned, if a point of the cross-section deduced or assigned has a smaller distance from the axis of the pipe with respect to the corresponding point of the actual cross-section of the pipe, the cutting tool will be moved excessively towards the cross-section to be cut, imparting on it an action greater than that expected which may negatively affect the integrity of the structure and/or cause the creation of burrs, scrapings on the pipe or damage to the cutting tool. On the other hand, if a point of the cross-section deduced or assigned has a greater distance from the axis of the pipe with respect to the corresponding point of the actual cross-section of the pipe, the cutting tool will not be moved close enough to the pipe and there will be the risk of not penetrating its thickness completely, generating an incomplete cut and resulting in possible rejection of the pipe.

The technical purpose of the invention is therefore to provide a unit for cutting thermoplastic pipes and a method which are able to overcome the drawbacks of the prior art.

DISCLOSURE OF THE INVENTION

The aim of the invention is therefore to provide a cutting unit for thermoplastic pipes which is able to perform a precise cutting of the pipe whatever the shape adopted by the cross-section of the pipe in the cutting plane.

A further aim of the invention is therefore to provide a unit for cutting thermoplastic pipes and a reliable, precise and simple method which do not require measurements of the actual dimensions of the pipes by the operators.

The technical purpose indicated and the aims specified are substantially achieved by a unit for cutting thermoplastic pipes and a method comprising the technical features described in one or more of the accompanying claims. The dependent claims correspond to possible embodiments of the invention.

In particular, the technical purpose indicated and the aims specified are achieved by a cutting unit for thermoplastic pipes comprising a ring rotating about an axis of rotation and wherein a pipe is progressively moved in a sliding fashion in such a way that a longitudinal axis of the pipe coincides with the axis of rotation. The cutting unit according to the invention also comprises at least one cutting arm mounted on the rotary ring and equipped with a cutting tool and having a relative portion integral with the rotary ring. The cutting arm is also movable between an operating position, wherein the cutting tool is engaged with the pipe to exert a cutting action, and a rest position, wherein the cutting tool is disengaged from the pipe. The cutting unit according to the invention also comprises at least one distance measurement sensor located on the rotary ring and configured for acquiring, during a rotation of the rotary ring, a plurality of values representing a radial distance between the at least one measurement sensor and an outer surface of the pipe. The distance is measured on a measurement plane which is transversal, in particular perpendicular, to the axis of rotation.

The rotation is complete in the case of a single distance measurement sensor; in the case of two or more distance measurement sensors, the rotation could also be partial (for example with 2 sensors, the rotation may be only 180°).

Preferably, the distance is measured on a cutting plane, that is to say, in the plane in which the cutting element is operatively active.

The cutting unit also comprises a processing and control unit operatively connected to the at least one distance measurement sensor and configured for receiving the plurality of values representing measured and for calculating, on the basis of the above-mentioned representative measured values, at least one parameter correlated with a peripheral profile of the pipe on the measurement plane.

In other words, the distance measurement sensor makes it possible to scan an outer surface of the pipe in the zone in which the cut must be made in such a way as to derive the actual profile of the pipe in this zone.

Advantageously, the possibility of obtaining the actual profile of the pipe of the cross-section in which the cut must be made allows the parts of the cutting unit to be adjusted and moved, and in particular the cutting tools, in such a way as to make a clean and precise cut at each point of the cross-section.

Advantageously, thanks to the possibility of reconstructing the actual cross-section of the pipe it is possible to detect whether the pipe has imperfections (such as bumps, recesses and surface irregularities) in the zone in which the cut must be made and consequently setting the movement of the cutting tool on the basis of the profile measured, guaranteeing, consequently, an optimum penetration for any type of cross-section and avoiding excessive stresses on the pipe or on the cutting unit.

Further features and advantages of the invention are more apparent in the non-limiting description which follows of a non-exclusive embodiment of a cutting unit and a method according to the invention.

BRIEF DESCRIPTION OF DRAWINGS

The description is set out below with reference to the accompanying drawings which are provided solely for purposes of illustration without restricting the scope of the invention and in which.

DETAILED DESCRIPTION OF PREFERRED EMBODIMENTS OF THE INVENTION

With reference to the accompanying drawings, the numeral 1 denotes a thermoplastic pipe cutting unit "T" configured to obtain pieces of pipe "T" starting from a continuous pipe "T".

The cutting unit 1 may be inserted inside an automatic cutter machine (not illustrated) in a system for forming pipes "T" made of thermoplastic material in such a way as to make pieces of predetermined measurements starting from a pipe "T" coming continuously from an extrusion station (not illustrated).

Figure 1A:
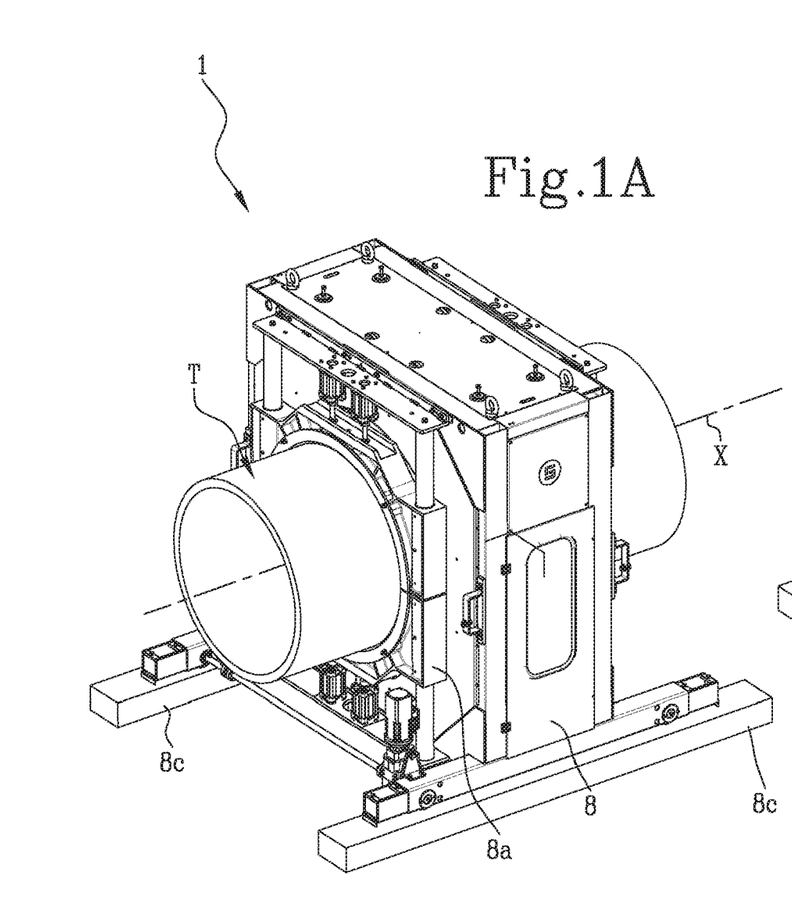
FIGS. 1A and 1B show, respectively, a perspective view of a cutting unit according to the invention wherein a frame is mounted on the cutting unit and wherein the frame is removed.

As illustrated in FIG. 1A, the cutting unit 1 comprises a frame 8 and one or more vices 8a, 8b configured for constraining the pipe "T" to the cutting unit 1 in such a way that the longitudinal axis of the pipe "T" coincides with the axis of rotation "X".

Preferably, the frame 8 is movable according to an alternating sliding movement along the guides 8c parallel to the axis of rotation "X" in such a way that the cutting unit 1, normally in standby position, can accelerate along the axis "X", reach the cutting zone in question and continue moving as one with the pipe "T" during the cutting operations and then return to a starting position at the end of them.

In use, in fact, the vices 8a, 8b are configured for constraining the cutting unit 1 to the pipe "T" in such a way that the cutting unit 1 is movable in sliding mode as one with the pipe "T" during the cutting operation. More in detail, in order to perform the cutting operations, the vices 8a, 8b tighten about the pipe "T" in such a way that the frame 8, and the entire cutting unit 1, slides along the axis of rotation "X" in the direction of feeding the pipe "T" together with the pipe "T". Once the cutting operations have been completed, that is to say, once the piece of pipe "T" has been obtained, the vices 8a, 8b open and the cutting unit 1 slides in the opposite direction to the feed direction of the pipe "T" to return to the starting position and perform a new operation for cutting the pipe "T".

Figure 1B:
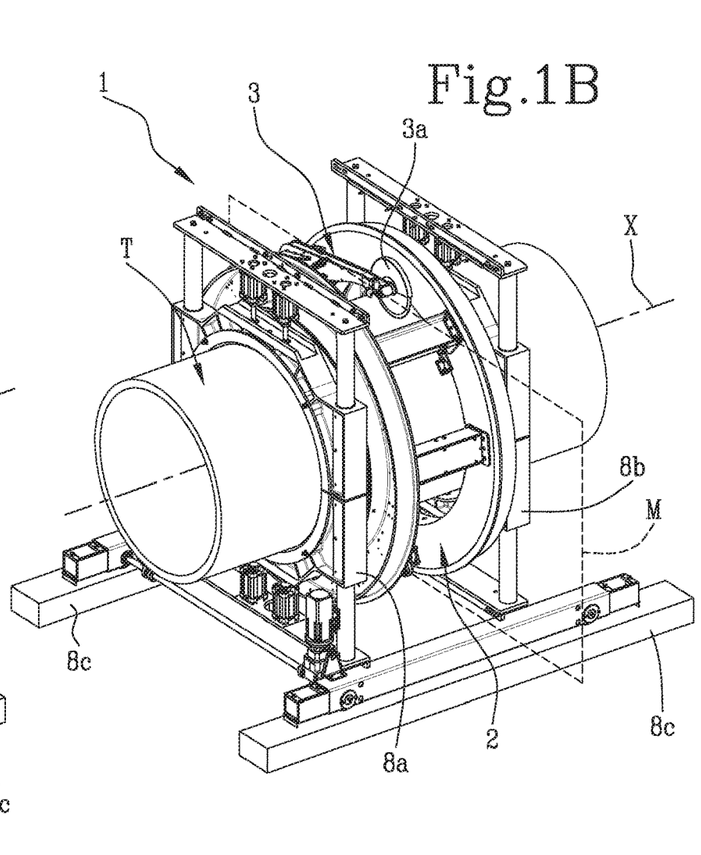

As shown in FIG. 1B, the cutting unit 1 also comprises a ring 2 rotating about the axis of rotation "X" and wherein the pipe "T" to be cut is progressively moved in a sliding fashion in such a way that the longitudinal axis of the pipe "T" coincides with the axis of rotation "X". Preferably, the rotary ring 2 is between the vices 8a, 8b and is inserted in the frame 8.

Figure 2:
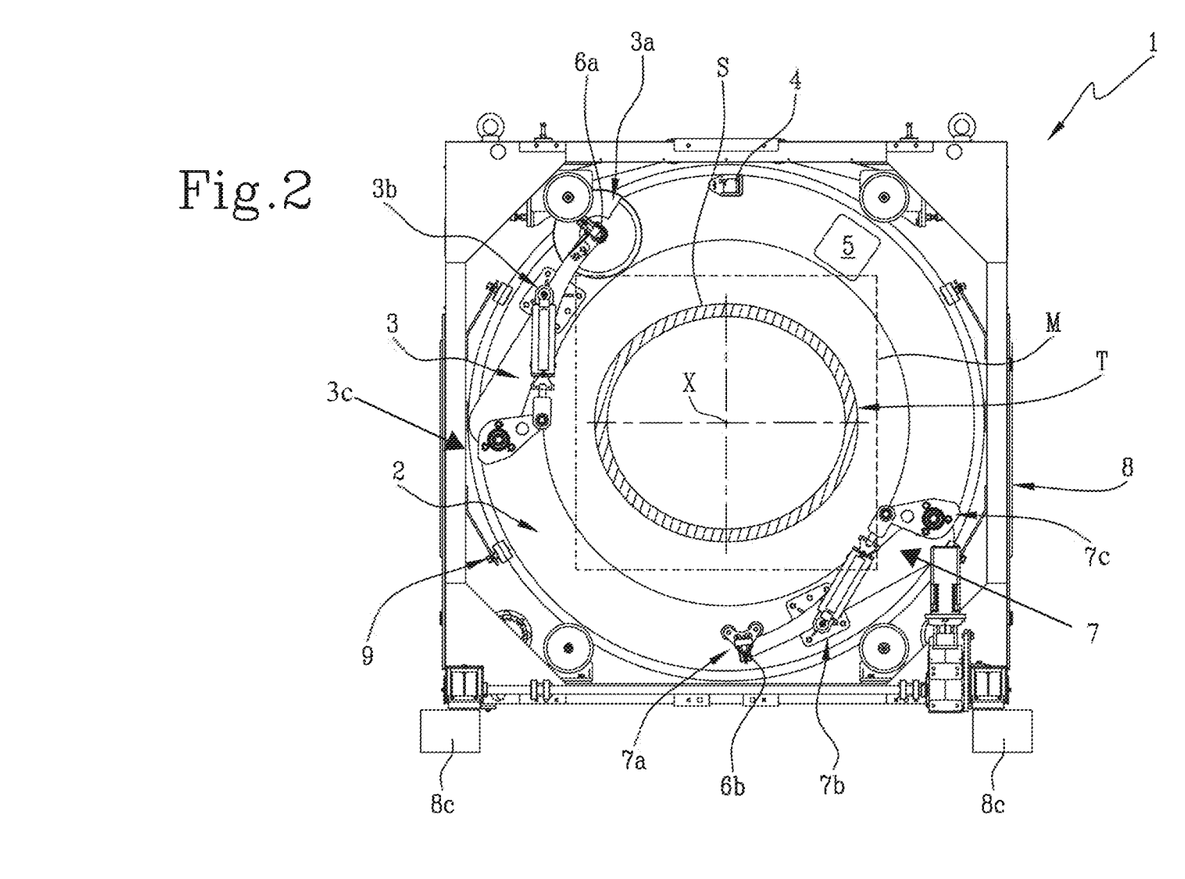
FIG. 2 is a front view of the cutting unit according to the invention.

Again as illustrated, for example in FIG. 2, the cutting unit 1 also comprises at least one cutting arm 3 mounted on the rotary ring 2 and equipped with a cutting tool 3a and having a relative portion 3b integral with the rotary ring 2.

Preferably, the cutting tool 3a is a circular idle blade in such a way as to make a cut on the pipe "T" by separation of material.

According to further possible embodiments (not illustrated) the cutting tool 3a is made in the form of a fixed blade or a circular motor-driven blade.

As shown in the accompanying drawings, the cutting arm 3 is movable between an operating position, wherein the cutting tool 3a is engaged with the pipe "T" for exerting a cutting action on the pipe "T", and a rest position, wherein the cutting tool 3a is disengaged from the pipe "T".

Preferably, the cutting arm 3 moves the cutting tool 3a between the operating position and the rest position and vice versa in a cutting plane at right angles to the axis of rotation "X".

Still more preferably, the cutting arm 3 moves the cutting tool 3a by means of an actuator 3c mounted on the rotary ring 2.

Figure 3A:
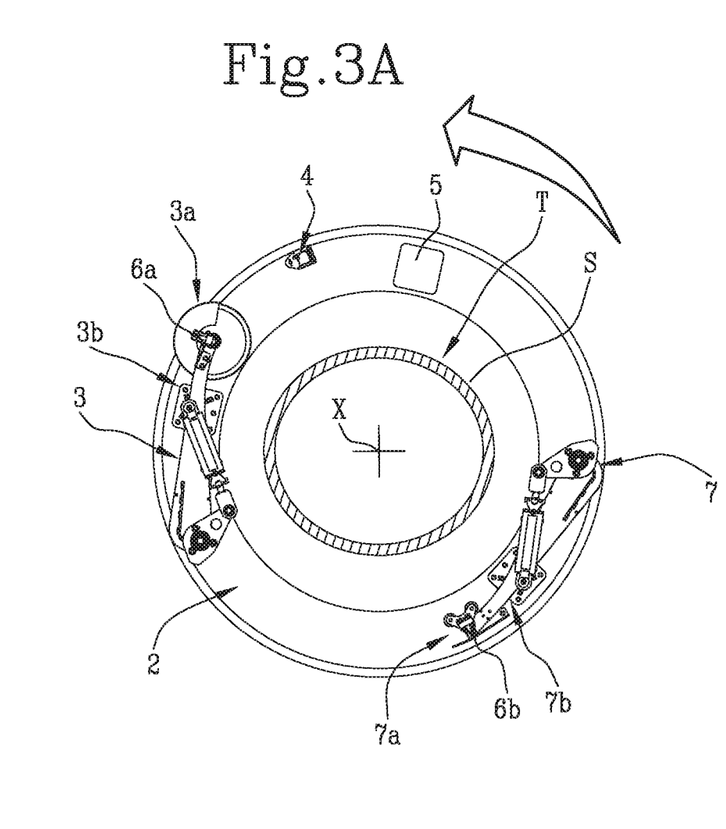
FIGS. 3A-3C show a succession of front views of the cutting unit in use.
Figure 3B:
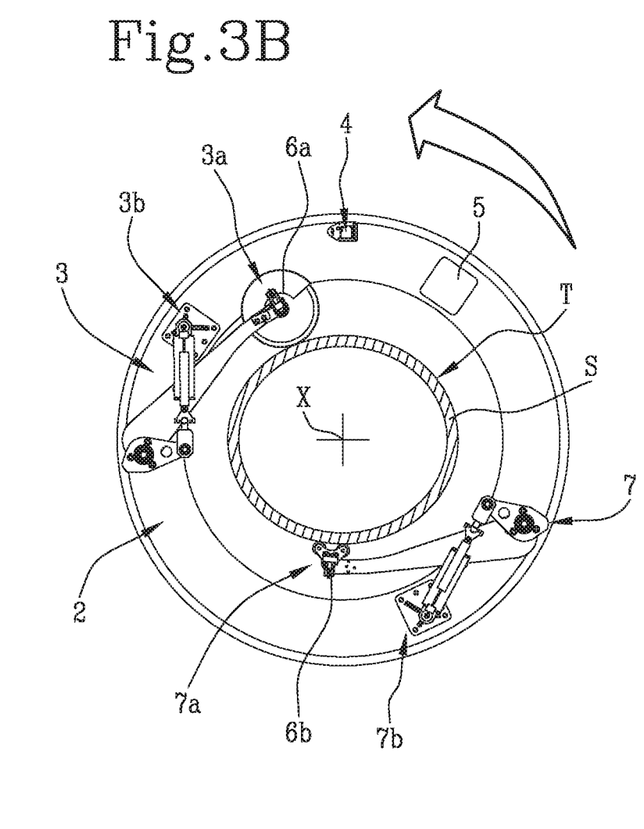
Figure 3C:
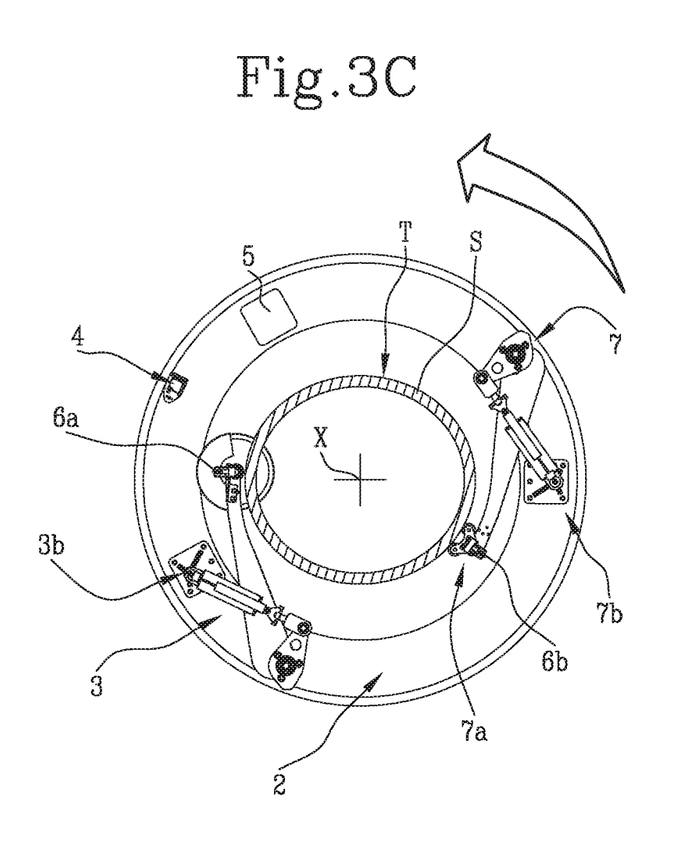

In other words, as shown, respectively, in FIGS. 3A-3C, at the operating position, the cutting tool 3a is firstly in contact with an outer surface "S" of the pipe "T" and subsequently penetrates its thickness by applying the cutting action to separate the piece of pipe "T" from the continuous pipe "T", whilst, in the rest position, the cutting tool 3a is away from the pipe "T" and is not in any contact with it in any way.

In use, therefore, in an initial step, the pipe "T" slides forwards along the direction defined by the axis of rotation "X" inside the rotary ring 2. Upon the cutting command, the frame 8 starts to advance, reaching the section to be cut and it synchronises with it. In this situation, the vices 8a, 8b are activated for closing for constraining the cutting unit 1 to the pipe "T" in such a way that it guarantees that the latter moves forward as one with the pipe "T" during the entire cutting process. After activating for the closing of the vices 8a, 8b, the cutting arm 3 is moved from the rest position to the operating position to impart a cutting action on the pipe "T". Whilst the cutting arm 3 is in an operating position, the rotary ring 2 performs one or more revolutions about the pipe "T" in such a way that the cutting tool 3a progressively performs a circumferential cut on the pipe "T" (cutting which occurs by sinking the tool 3a into the thickness of the pipe T) and separates the piece of pipe "T" from the continuous pipe "T". At the end of the cutting operation, the cutting arm 3 (and therefore the cutting tool 3a) is returned to the rest position, the vices 8a, 8b release the cutting unit 1 from the pipe "T" in such a way that the latter is free to slide along the tracks 8c in the opposite direction to the feeding of the pipe "T" for repositioning and being able to perform a new cutting operation.

Figure 4:
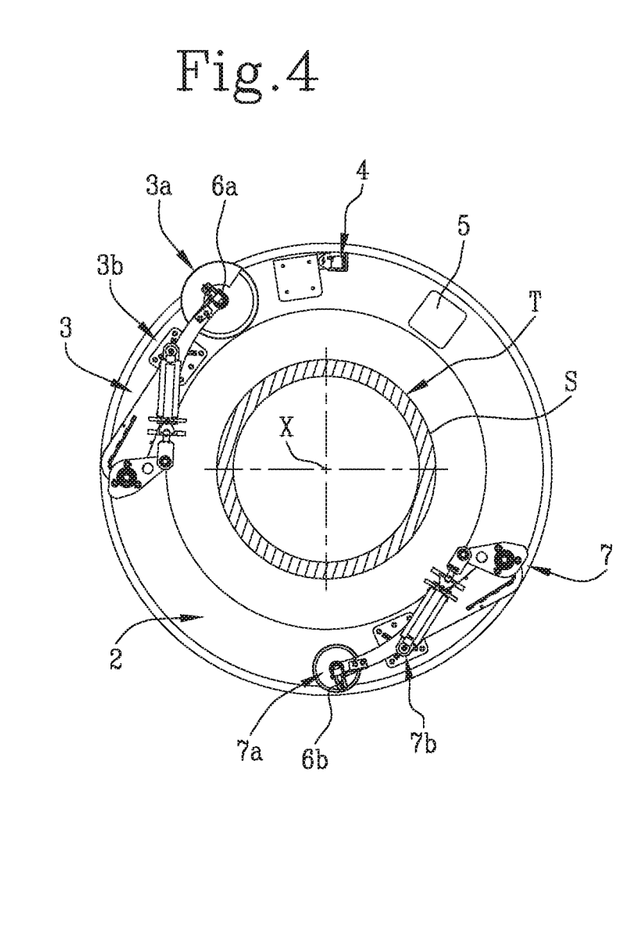
FIG. 4 is a front view of a further embodiment of the cutting unit according to the invention.

According to a possible embodiment shown in FIG. 4, the cutting unit 1 comprises two cutting arms 3 positioned preferably in diametrically opposite positions with respect to the rotary ring 2 and also acting simultaneously on the pipe "T" to perform a cutting action. Preferably, the cutting arms 3 are moved between the operating position and the rest position at the same time. Even more preferably, according to this embodiment, one cutting tool 7a of the cutting arm 7 has smaller dimensions than the cutting tool 3a of the other cutting arm 3.

Advantageously, the presence of two cutting arms 3 and 7 is used generally with particularly large thicknesses of pipe wherein a first portion of thickness is cut by a cutting tool 7a of smaller but more robust extension, creating a first precise groove inside which the second cutting tool 3a (of necessarily larger size for being able to deal with the entire thickness, but for this reason more flexible) is then guided until completion of the cut which will be without misalignments or deviations. The simultaneous action of the two tools then accelerates the overall cutting action, thus increasing the production rate of the entire cutting unit.

As shown in FIG. 2, the cutting unit 1, according to the invention, comprises at least one distance measurement sensor 4.

The distance measurement sensor 4 can be selected, preferably, but without limiting the scope of the invention, between a laser sensor or an ultrasound sensor.

The measurement sensor 4 is located on the rotary ring 2 (that is, supported as one by the rotary ring 2) and is configured for acquiring, during rotation of the rotary ring 2, a plurality of values representing a radial distance between the at least one measurement sensor 4 and the outer surface "S" of the pipe "T". The distance is measured on a measurement plane "M" transversal, in particular perpendicular, to the axis of rotation "X".

Preferably, the measurement plane "M" on which the measurement sensor 4 measures the distance coincides with the cutting plane on which the cutting tool 3a of the cutting arm 3 acts.

Advantageously, in this situation, the measurement of the distance by the measurement sensor 4 occurs exactly in the same plane in which the cut is then made by means of the cutting tool 3a in such a way as to render the cutting unit 1 precise and reliable.

The cutting unit 1 also comprises a processing and control unit 5 operatively connected to the measurement sensor 4 and configured for receiving the plurality of representative values measured and for calculating, on the basis of the above-mentioned representative values measured, at least one parameter representing a peripheral profile of the pipe T on the measurement plane M.

Preferably, the processing and control unit 5 is positioned on the rotary ring 2.

Preferably, the unit comprises an actuator of said cutting arm 3, for moving said cutting tool 3a between the operating position and the rest position. The processing and control unit 5 is operatively connected to the actuator of the cutting arm 3 for moving the cutting tool 3a (towards and away from the pipe) as a function of said parameter representing a peripheral profile of said pipe T on said measurement plane M, derived on the basis of the values representing a radial distance acquired by the distance measurement sensor 4.

According to another aspect, the processing and control unit 5 is configured to send to the actuator of the cutting arm 3 a signal of movement towards, or away from, said pipe T as a function of a comparison between the value measured by a first sensor 6a (located at the cutting tool 3a) and an expected positioning value, with said positioning value calculated on the basis of the values representing the radial distance acquired by the distance measurement sensor 4.

According to a further possible embodiment, not illustrated, the processing and control unit 5 is positioned on a portion of the frame 8.

In use, before performing the actual cutting operation by means of the cutting tool 3a, once the vices 8a, 8b have been clamped, the rotary ring 2 is rotated about the pipe "T" in such a way that the measurement sensor 4 is able to measure on the measurement plane "M" the radial distance of several points of the outer surface "S" of the pipe "T" for obtaining a plurality of values representing the radial distance of the various points.

In this situation, the values representing the radial distance of the various points are sent to the processing and control unit 5 which processes them in such a way as to obtain the trend of the actual peripheral profile of the cross-section of the pipe "T" lying on the measurement plane "M". Once the actual peripheral profile (and preferably the entire profile) adopted by the pipe "T" on the measurement plane "M" is acquired, the cutting tool 3a is moved on the cutting plane (according to the embodiment illustrated in the drawings it coincides with the measurement plane "M"), from the rest position to the cutting position. In this situation, the cutting tool 3a (rotating about the pipe as is installed on the rotary ring 2) is made to penetrate progressively in the pipe "T" following the trend of the profile acquired, in such a way as to always perform a (calibrated) circumferential cut on the pipe "T" for separating the piece of pipe "T" from the remaining continuous pipe "T".

Advantageously, therefore, the possibility of measuring the actual peripheral profile of the pipe "T" on the measurement plane "M" allows precise cutting operations to be performed even in the case of non-elliptical sections and/or having imperfections such as recesses or depressions. In fact, in this situation, by knowing the actual shape of the profile of the pipe "T" in the measurement plane "M", it is possible to move and adjust the cutting tool 3a in such a way that it is always in the desired position with respect to the pipe "T" and consequently applies the correct cutting action at every point of it.

Advantageously, the possibility of detecting the actual cross-section of the pipe "T" lying on the measurement plane "M" allows precise and calibrated cutting operations to be performed in any shape of the profile of the cross-section of the pipe "T" adopted in the measurement plane "M", without the operator having to intervene in order to compensate for any imperfections or lack of roundness of the pipe.

Advantageously, the fact that the measurement plane "M" coincides with the cutting plane makes it possible to know the actual shape of the cross-section on which the cutting tool 3a must act and thus allows the cutting tool 3a to be moved, during rotation of the rotary ring 2, in a more precise manner preventing the risk of applying an excessive or insufficient penetration on the pipe "T".

According to the preferred embodiment, the cutting unit 1 also comprises, as mentioned, a first sensor 6a located on the cutting tool 3a and configured for acquiring, at different angular positions of the cutting tool 3a, a plurality of values representing a distance, measured on the measurement plane "M", between the cutting tool 3a and the outer surface "S" of the pipe "T". In this situation, the processing and control unit 5 is also configured for receiving and processing these representative values and for performing a comparison with the parameters correlated with the peripheral profile in respective angular positions. The processing and control unit 5 is also configured for sending to the cutting tool 3a any movement signal towards or away from the pipe T as a function of the value measured by the first sensor 6a if the distances measured by the sensor 6a deviate from those expected.

In use, once the profile of the pipe "T" on the measurement plane "M" has been acquired by means of the measurement sensor 4, the cutting arm 3 is moved in such a way as to position itself as if the cutting tool 3a had to perform the cutting of a pipe "T" having on the measurement plane "M" a diameter equal to the maximum diameter measured by the measurement sensor 4. During rotation of the rotary ring 2, the first sensor 6a is activated in such a way as to acquire, at different angular positions of the cutting tool 3a, a plurality of values representing the actual radial distance between the cutting tool 3a and the outer surface "S" of the pipe "T" measured on the measurement plane "M". For each angular position, the respective representative value is sent to the processing and control unit 5 which processes this value and in particular compares the value with the parameters correlated with the peripheral profile in the respective angular position. By means of this comparison it is possible to understand whether the actual position of the cutting tool 3a, in each angular position, is correct relative to the actual profile of the pipe "T" on the cutting plane. In fact, as a function of the value measured by the first sensor 6a, the processing and control unit 5 can send to the actuator which moves the cutting arm 3 and, therefore, the cutting tool 3a, a movement signal towards or away from the pipe "T", if it is necessary to correct the actual position of the cutting tool 3a with respect to that correlated with the peripheral profile determined by the sensor 4.

In other words, the first sensor 6a allows a closed control to be performed during the cutting operations in such a way that the cutting arm 3 always positions the cutting tool 3a at an optimum distance with respect to the actual profile of the outer surface "S" of the pipe "T" for each angular position adopted by the cutting tool 3a during rotation of the rotary ring 2.

In other words, during rotation of the rotary ring 2, the cutting arm 3 moves on the measurement plane "M" towards or away from the cutting tool 3a from the outer surface "S" of the pipe "T" on the basis of the comparison between the data supplied by the first sensor 6a and those acquired thanks to the measurement sensor 4, in such a way as to "follow" the actual profile adopted by the pipe "T" in that measurement plane "M".

According to a preferred embodiment (as shown in FIG. 2), the cutting unit 1 according to the invention also comprises at least one contact arm 7 equipped with a contact element 7a for the pipe "T" and having a relative portion 7b integral with the rotary ring 2.

Preferably, the contact arm 7 is mounted on the rotary ring 2 in such a way as to be diametrically opposite the cutting arm 3.

Preferably, the contact element 7a lies mainly on the plane "M".

In use, when the rotary ring 2 is rotated in such a way that the cutting tool 3a makes a cut of the pipe "T" for separation, the contact arm 7 is also moved in such a way that the contact element 7a is in contact with a portion of the outer surface "S" of the pipe "T" opposite to the portion on which the cutting tool 3a is operating. Since both the arms are integral with the rotary ring 2, when the cutting tool 3a changes its angular position, the contact element 7a also changes its angular position in such a way that it is always substantially in a position diametrically opposite to the cutting element 3a.

Advantageously, during cutting, the contact element 7a supports the portion of the pipe "T" preventing any bending due both to the penetration action of the cutting element 3a and the weight of the pipe (bending particularly visible during the final step of the cut when the pipe loses axial rigidity), thus guaranteeing a better precision and final quality of the cut.

Preferably, as shown for example in FIG. 2, the contact element 7a is made in the form of one or more idle supporting rollers, resting on the outer surface "S" of the pipe "T".

Advantageously, the rollers allow the contact element 7a to be moved in rolling contact along the outer surface "S" of the pipe "T" without damaging the outer surface "S" by scraping or scratching.

According to the preferred embodiment, the contact arm 7 is also movable on the measurement plane "M" between an operating position, wherein the contact element 7a is in contact with the pipe "T" for applying an action for supporting the pipe "T", and a rest position, wherein the contact element 7a is moved away from the pipe "T".

Preferably, like the cutting arm 3, the contact arm 7 is also movable by means of an actuator 7c.

According to another aspect, therefore, the unit comprises an actuator 7c of the contact arm 7, for moving said contact element 7a between the operating position and the rest position. The processing and control unit 5 is operatively connected to the actuator of said contact arm 7 for moving the contact element 7a as a function of said parameter representing a peripheral profile of said pipe T on said measurement plane M, derived on the basis of the values representing a radial distance by the distance measurement sensor 4.

According to yet another aspect, the processing and control unit 5 is configured to send to the actuator of the contact arm 7 a signal of movement towards, or away from, said pipe T as a function of a comparison between the value measured by a second sensor 6b (located at the contact element 7a) and an expected positioning value, calculated on the basis of the values representing the radial distance acquired by the distance measurement sensor 4.

In use, the contact arm 7 passes from the operating position to the rest position and vice versa when the cutting arm 3 also passes from the operating position to the rest position and vice versa in such a way that the contact element 7a acts in conjunction with the cutting tool 3a to perform the operation for cutting the pipe "T" on the measurement plane "M".

Preferably, the cutting unit 1 also comprises a second sensor 6b located on the contact element 7a and configured for acquiring, at different angular positions of the contact element 7a, a plurality of values representing a distance, measured on the measurement plane "M", between the contact element 7a and the outer surface "S" of the pipe "T".

Even more preferably, the processing and control unit 5 is also configured to receive and process the above-mentioned representative values and to perform a comparison with the parameters correlated with the peripheral profile in respective angular positions. This aspect makes it possible to check that the position adopted by the contact element 7a at different angular positions of the rotary ring 2 is correct relative to the trend of the actual profile of the pipe "T" adopted on the measurement plane "M" and acquired by the measurement sensor 4.

The processing and control unit 5 is also configured for sending to the contact element 7a, following the above-mentioned comparison, any movement signal towards or away from the pipe "T" as a function of the value measured by the second sensor 6b. In this situation, the second sensor 6b allows a closed control to be performed in such a way that the unit 5 can modify the position of the contact element 7a on the basis of the comparison between the trend of the actual profile of the pipe "T" on the measurement plane "M" determined by the sensor 4 and the distances measured directly by the sensor 6b. This guarantees that the contact element 7a is always in the correct condition of support on the surface S of the pipe, without being either too far from it (thereby not performing the function of supporting against bending) or too close to it (forcing excessively on the surface of the pipe, generating marks on the surface of the pipe or producing mechanical stress on the parts).

In use, therefore, the pipe "T", advancing along the axis of rotation "X", enters into the cutting unit 1 in such a way as to insert inside the rotary ring 2. At the desired cutting signal, the frame 8 starts to slide along the guides 8c reaching the area for cutting; the vices 8a, 8b clamp around the pipe "T", whilst the frame 8 is moving at the same speed as the pipe "T", in such a way that the entire cutting unit 1 advances as one with the pipe "T" along the axis of rotation "X".

During the feeding of the cutting unit 1, the cutting tool 3a and the contact element 7a are initially in the rest position and the rotary ring 2 is rotated in such a way that the distance measurement sensor 4 measures, on the measurement plane "M", for a plurality of angular positions adopted by the rotary ring 2, a plurality of values representing the radial distance between the measurement sensor 4 and the outer surface "S" of the pipe "T".

After the measurement step, the plurality of representative values measured is sent to the processing and control unit 5 where it is processed for calculating at least one parameter representing a peripheral profile of the pipe "T" on the measurement plane "M".

After acquiring the trend of the peripheral profile adopted by the pipe "T" on the measurement plane "M", the cutting arm 3 and the contact arm 7 are pre-positioned as if they had to act on a pipe "T" having, on the measurement plane "M", a diameter having a value equal to the maximum value acquired by the measurement sensor 4. Preferably, in order to perform this positioning, the cutting arm 3 and the contact arm 7 each have a potentiometer.

After this first positioning, the rotary ring 2 remains in rotation about the pipe "T" whilst the cutting arm 3 and the contact arm 7 pass from said pre-positioning position to the operating position.

During rotation of the rotary ring 2, the first sensor 6a acquires, at different angular positions of the cutting tool 3a, a plurality of values representing a radial distance, measured on the measurement plane "M", between the cutting tool 3a and the outer surface "S" of the pipe "T". Simultaneously, the second sensor 6b acquires, at different angular positions of the contact element 7a, a plurality of values representing a radial distance, measured on the measurement plane "M", between the contact element 7a and the outer surface "S" of the pipe "T".

In this way, it is possible to know at any time the actual position of the cutting tool 3a and/or of the contact element 7a relative to the surface of the pipe.

According to the preferred embodiment, the first and the second sensors 6a, 6b are made in the form of laser sensors or ultrasound sensors.

At the same time as the above-mentioned acquisition steps, the representative values are sent to the processing and control unit 5 which processes them and compares them with the parameters correlated with the peripheral profile previously determined in the corresponding angular positions (profile determined by means of the points measured by the distance measurement sensor 4). Subsequently, any approach or moving away signal is sent both to the cutting tool 3a and to the contact element 7a as a function of the parameters measured respectively by the first and second sensors 6a, 6b if it is necessary to change the actual positions with respect to those correlated with the peripheral profile determined by the sensor 4. In this way, all the cutting operations are carried out through a complete closed control of the positions of tools and contact elements, which guarantees a high level of precision of the cut.

In other words, thanks to the acquisition of the actual profile of the pipe "T" on the measurement plane "M" by means of the measurement sensor 4 and thanks to the comparison with the distances acquired at different angular positions from the first and the second sensor 6a, 6b, it is possible to correct, for each point of the outer surface "S", the corresponding positioning of the cutting tool 3a and of the contact element 7a in such a way that they always follow precisely the actual profile of the pipe "T" in order to carry out a particularly accurate cut whatever the shape of the profile of the pipe "T".

Advantageously, the cooperation of the measurement sensor 4 and of the first and the second sensors 6a, 6b makes it possible to modify the positions at any instant, and in particular the radial distance from the outer surface "S" of the pipe "T", of the cutting tool 3a and the contact element 7a depending on the trend of the actual profile of the pipe "T" on the measurement plane "M".

Advantageously, the cooperation of the measurement sensor 4 and the first and the second sensor 6a, 6b makes it possible to ensure that the cutting element 3a (and the contact element 7a if present) is always in the correct position to impart an optimum penetration action during the cutting, which translates both into not creating excessive forces on the cutting tool 3a (and on the contact element 7a) and in effectively penetrating the entire thickness of the pipe "T", completely separating the piece of pipe "T" from the continuous pipe (and suitably supporting it with the contact element 7a if present).

According to a preferred embodiment, the cutting unit 1 also comprises an adjustment sensor 9 (shown in FIG. 2) positioned on the frame 8 and configured for measuring an angular position of the rotary ring 2 with respect to the frame 8 and for defining an orientation of the peripheral profile of the pipe "T" on the measurement plane "M".

Preferably, the adjustment sensor 9 is a sensor of the capacitive type and provides a reference of the angular position of the rotary ring 2 in space and over time.

Advantageously, the adjustment sensor 9 is useful as it ensures that the measurement sensor 4 starts to perform its measurement always from the same point and allows the profile measured on the corresponding measurement plane "M" to be oriented uniquely.

The adjustment sensor 9 may be, more generally, a sensor of any type.

The invention achieves the preset aims overcoming the drawbacks of the prior art.

In particular, the presence of the measurement sensor 4 makes it possible to scan (that is, acquire the profile of) the outer surface "S" of the pipe "T" on the measurement plane "M" for reconstructing by points the actual section of the pipe "T" in such a way as to move in a more precise manner the cutting tools 3a and/or the contact element 7a avoiding the risk of imparting an excessive or insufficient cutting action.

The presence of the first and the second sensor 6a and 6b, located at, respectively, the tool 3a and the contact element 7a allow the cutting unit 1 to be more precise in the cutting since they allow a closed control to be performed on the instantaneous position both of the cutting tool 3a and of the contact element 7a.

The presence of the first and the second sensor 6a, 6b allows, if necessary, modification and adjustment of the positioning of the cutting tool 3a and the contact element 7a depending on the trend of the actual profile of the pipe "T" acquired by the measurement sensor 4.

The cutting unit 1 according to the invention is therefore precise, reliable and versatile since it is able to make precise and accurate cuts irrespective of the shape of the cross-section of the pipe "T", adapting in a unique and real time manner the action of the cutting and contact means as a function of the specific profile of the pipe at the zone subject to the cut, increasing considerably the ease of use and the versatility of the entire cutting process on lines for extruding pipes made of thermoplastic material, eliminating corrective actions required by the operators or any incorrect settings and guaranteeing a complete automation of the process.

The invention claimed is:

1. A cutting unit for thermoplastic pipes comprising:
a rotary ring rotatable about an axis of rotation and in which a pipe is progressively moved in a sliding fashion such that a longitudinal axis of the pipe coincides with said axis of rotation;
at least one cutting arm mounted on the rotary ring and equipped with a cutting tool and having a relative portion integral with said rotary ring, said at least one cutting arm also being movable between a first operating position, wherein said cutting tool is engaged with said pipe for exerting a cutting action, and a first rest position, wherein said cutting tool is disengaged from said pipe;
at least one distance measurement sensor located on said rotary ring and configured for acquiring, during a rotation of said rotary ring, a plurality of representative values representing a first radial distance between said at least one measurement sensor and an outer surface of said pipe, said first radial distance being measured on a measurement plane transversal to said axis of rotation;
a processing and control unit operatively connected to said at least one distance measurement sensor and configured to receive said plurality of representative values measured and to calculate, based on said plurality of representative values measured, at least one peripheral profile parameter representing a peripheral profile of said pipe on said measurement plane;
a second sensor located on said cutting tool and configured for acquiring, at different angular positions of said at least one cutting tool, a plurality of second representative values representing a second radial distance between said cutting tool and said outer surface of the pipe, said second radial distance being measured on said measurement plane.

2. The cutting unit according to claim 1, wherein the at least one distance measurement sensor is configured for acquiring, during a complete rotation of said rotary ring, said plurality of representative values.

3. The cutting unit according to claim 1, and further comprising an actuator of said at least one cutting arm, for moving said cutting tool between the first operating position and the first rest position, and wherein the processing and control unit is operatively connected to the actuator of the at least one cutting arm for moving the cutting tool as a function of said at least one peripheral profile parameter, derived on a basis of the plurality of representative values acquired by the at least one distance measurement sensor.

4. The cutting unit according to claim 3, wherein said processing and control unit is configured to send to the actuator of the at least one cutting arm a signal of movement towards, or away from, said pipe as a function of a comparison between at least one of the plurality of second representative values measured by said second sensor and a respective expected positioning value, said respective expected positioning value being calculated on a basis of the plurality of representative values representing the first radial distance acquired by the at least one distance measurement sensor.

5. The cutting unit according to claim 1, wherein said at least one cutting arm moves said cutting tool in a cutting plane at right angles to said axis of rotation.

6. The cutting unit according to claim 5, wherein said measurement plane coincides with said cutting plane.

7. The cutting unit according to claim 1, wherein said at least one distance measurement sensor is selected from: a laser sensor; or an ultrasonic sensor.

8. The cutting unit according to claim 1, and further comprising one or more vises configured for constraining said pipe to said cutting unit in such a way that said longitudinal axis of the pipe coincides with said axis of rotation.

9. The cutting unit according to claim 1, and further comprising at least one contact arm including at least one contact element for the pipe and having a relative portion integral with said rotary ring, said at least one contact arm being also movable between a second operating position, wherein said at least one contact element is in contact with said pipe for exerting an action for supporting said pipe, and a second rest position, wherein said at least one contact element is away from the pipe, said at least one contact element being diametrically opposite said at least one cutting arm.

10. The cutting unit according to claim 9, and further comprising a third sensor located on said at least one contact element and configured for acquiring, at different angular positions of said at least one contact element, a plurality of third representative values representing a third radial distance between said at least one contact element and said outer surface of the pipe, said third radial distance being measured on said measurement plane.

11. The cutting unit according to claim 10, and further comprising an actuator of said at least one contact arm, for moving said at least one contact element between the second operating position and the second rest position, and wherein the processing and control unit is operatively connected to the actuator of said at least one contact arm for moving the at least one contact element as a function of said at least one peripheral profile parameter, derived on a basis of the plurality of representative values.

12. The cutting unit according to claim 11, wherein the processing and control unit is configured to send to the actuator of the at least one contact arm a signal of movement towards, or away from, said pipe as a function of a comparison between at least one of the plurality of third representative values by said third sensor and an expected positioning value, said expected positioning value being calculated on a basis of the plurality of representative values.

13. The cutting unit according to claim 1, wherein said processing and control unit is positioned on said rotary ring.

14. The cutting unit according to claim 1, comprising a frame designed for supporting said rotary ring and movable according to an alternating sliding movement along the axis of rotation, and an adjustment sensor, positioned on said frame and configured for measuring an angular position of said rotary ring relative to the frame.

15. A cutting unit for thermoplastic pipes comprising:
a rotary ring rotatable about an axis of rotation and in which a pipe is progressively moved in a sliding fashion such that a longitudinal axis of the pipe coincides with said axis of rotation;
at least one cutting arm mounted on the rotary ring and equipped with a cutting tool and having a relative portion integral with said rotary ring, said at least one cutting arm also being movable between a first operating position, wherein said cutting tool is engaged with said pipe for exerting a cutting action, and a first rest position, wherein said cutting tool is disengaged from said pipe;
at least one distance measurement sensor located on said rotary ring and configured for acquiring, during a rotation of said rotary ring, a plurality of representative values representing a first radial distance between said at least one measurement sensor and an outer surface of said pipe, said first radial distance being measured on a measurement plane transversal to said axis of rotation;
a processing and control unit operatively connected to said at least one distance measurement sensor and configured to receive said plurality of representative values measured and to calculate, based on said plurality of representative values measured, at least one peripheral profile parameter representing a peripheral profile of said pipe on said measurement plane;
at least one contact arm including at least one contact element for the pipe and having a relative portion integral with said rotary ring, said at least one contact arm being also movable between a second operating position, wherein said at least one contact element is in contact with said pipe for exerting an action for supporting said pipe, and a second rest position, wherein said at least one contact element is away from the pipe, said at least one contact element being diametrically opposite said at least one cutting arm;
a third sensor located on said at least one contact element and configured for acquiring, at different angular positions of said at least one contact element, a plurality of third representative values representing a third radial distance between said at least one contact element and said outer surface of the pipe, said third radial distance being measured on said measurement plane.

16. A method comprising the following steps:
providing a cutting unit for thermoplastic pipes comprising:
a rotary ring rotatable about an axis of rotation and in which a pipe is progressively moved in a sliding fashion such that a longitudinal axis of the pipe coincides with said axis of rotation;
at least one cutting arm mounted on the rotary ring and equipped with a cutting tool and having a relative portion integral with said rotary ring, said at least one cutting arm also being movable between a first operating position, wherein said cutting tool is engaged with said pipe for exerting a cutting action, and a first rest position, wherein said cutting tool is disengaged from said pipe;
at least one distance measurement sensor located on said rotary ring and configured for acquiring, during a rotation of said rotary ring, a plurality of representative values representing a first radial distance between said at least one measurement sensor and an outer surface of said pipe, said first radial distance being measured on a measurement plane transversal to said axis of rotation;
a processing and control unit operatively connected to said at least one distance measurement sensor and configured to receive said plurality of representative values measured and to calculate, based on said plurality of representative values measured, at least one peripheral profile parameter representing a peripheral profile of said pipe on said measurement plane;

a second sensor located on said cutting tool and configured for acquiring, at different angular positions of said at least one cutting tool, a plurality of second representative values representing a second radial distance between said cutting tool and said outer surface of the pipe, said second radial distance being measured on said measurement plane;

rotating said rotary ring;

measuring, using said at least one distance measurement sensor, for a plurality of angular positions adopted by the rotary ring rotating about the pipe, the plurality of representative values;

processing, using said processing and control unit, said plurality of representative values for calculating, based on said plurality of representative values measured, said at least one peripheral profile parameter.

17. The method according to claim 16, comprising a step of moving, towards or away of the pipe, said at least one cutting arm on the basis of said at least one peripheral profile parameter representing the peripheral profile of said pipe on said measurement plane calculated as a function of said plurality of representative values.

18. The method according to claim 16, also comprising the steps of:

acquiring, using said second sensor, at least one of said plurality of second representative values;

comparing said at least one of said plurality of second representative values with said at least one peripheral profile parameter;

moving the cutting tool towards or away from said pipe as a function of the comparison.

19. The method according to claim 16, and further comprising the steps of:

providing:
at least one contact arm including at least one contact element for the pipe and having a relative portion integral with said rotary ring, said at least one contact arm being also movable between a second operating position, wherein said at least one contact element is in contact with said pipe for exerting an action for supporting said pipe, and a second rest position, wherein said at least one contact element is away from the pipe, said at least one contact element being diametrically opposite said at least one cutting arm;

a third sensor located on said at least one contact element and configured for acquiring, at different angular positions of said at least one contact element, a plurality of third representative values representing a third radial distance between said at least one contact element and said outer surface of the pipe, said third radial distance being measured on said measurement plane;

acquiring, using said third sensor, at least one of said plurality of third representative values;

comparing said at least one of said plurality of third representative values with said at least one peripheral profile parameter;

moving the at least one contact element towards, or away from, said pipe as a function of said comparison between said at least one of said plurality of third representative values and said at least one peripheral profile parameter.

* * * * *